(12) United States Patent
Medina et al.

(10) Patent No.: US 12,438,163 B2
(45) Date of Patent: *Oct. 7, 2025

(54) METHOD FOR BONDING COMPONENTS OF A FUEL CELL

(71) Applicant: CELLCENTRIC GMBH & CO. KG, Kirchheim unter Teck (DE)

(72) Inventors: Michael Medina, Kirchheim/Teck-Nabern (DE); Michael Szperkowicz, Kirchheim/Teck-Nabern (DE); Thomas Maassen, Kirchheim/Teck-Nabern (DE); Cole Patterson, Kirchheim/Teck-Nabern (DE)

(73) Assignee: CELLCENTRIC GMBH & CO. KG, Kirchheim Unter Teck (DE)

( * ) Notice: Subject to any disclaimer, the term of this patent is extended or adjusted under 35 U.S.C. 154(b) by 683 days.

This patent is subject to a terminal disclaimer.

(21) Appl. No.: 17/764,662

(22) PCT Filed: Nov. 26, 2019

(86) PCT No.: PCT/EP2019/082500
§ 371 (c)(1),
(2) Date: Mar. 29, 2022

(87) PCT Pub. No.: WO2021/063525
PCT Pub. Date: Apr. 8, 2021

(65) Prior Publication Data
US 2022/0344679 A1 Oct. 27, 2022

(30) Foreign Application Priority Data
Sep. 30, 2019 (DE) .......................... 102019006820.3

(51) Int. Cl.
*H01M 8/0286* (2016.01)
*C09J 5/06* (2006.01)
(Continued)

(52) U.S. Cl.
CPC ............. *H01M 8/0286* (2013.01); *C09J 5/06* (2013.01); *C09J 163/00* (2013.01);
(Continued)

(58) Field of Classification Search
CPC ............. H01M 8/0286; H01M 8/0267; H01M 8/0273; H01M 8/0284; H01M 2008/1095;
(Continued)

(56) References Cited

U.S. PATENT DOCUMENTS

| 4,507,340 A | 3/1985 | Rinde et al. |
| 2004/0137308 A1 | 7/2004 | Maeda et al. |

(Continued)

FOREIGN PATENT DOCUMENTS

| CN | 1527869 | 9/2004 | |
| CN | 1527869 A | * 9/2004 | ............. C08G 59/18 |

(Continued)

OTHER PUBLICATIONS

Official Action with English Translation for China Patent Application No. 201980100904.2, dated May 1, 2024, 10 pages.

(Continued)

*Primary Examiner* — Daniel S Gatewood
(74) *Attorney, Agent, or Firm* — Sheridan Ross P.C.

(57) ABSTRACT

The invention is related to a method for bonding components of a PEM fuel cell with a frame and/or amongst one another, wherefore an adhesive curable by electromagnetic radiation in the range of visible light or UV is applied to the frame and/or the at least one component.
The invention is characterized in that the adhesive is activated by the electromagnetic radiation and heated after the (Continued)

Figure 1:
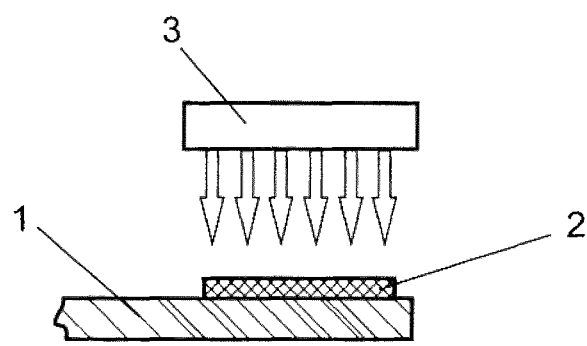

frame and/or components are brought into contact; or the frame and/or the components are brought into contact and the adhesive is exposed to electromagnetic radiation for activating and heating; to reduce its viscosity before the adhesive is finally cured.

20 Claims, 5 Drawing Sheets

(51) Int. Cl.
    *C09J 163/00*     (2006.01)
    *H01M 8/0267*     (2016.01)
    *H01M 8/0273*     (2016.01)
    *H01M 8/0284*     (2016.01)
    *H01M 8/10*     (2016.01)

(52) U.S. Cl.
    CPC ....... *H01M 8/0267* (2013.01); *H01M 8/0273* (2013.01); *H01M 8/0284* (2013.01); *C09J 2203/33* (2013.01); *C09J 2301/304* (2020.08); *C09J 2463/00* (2013.01); *H01M 2008/1095* (2013.01)

(58) Field of Classification Search
    CPC ........ H01M 8/1004; C09J 5/06; C09J 163/00; C09J 2203/33; C09J 2301/304; C09J 2463/00; Y02E 60/50
    See application file for complete search history.

(56) References Cited

U.S. PATENT DOCUMENTS

| | | | |
|---|---|---|---|
| 2004/0159391 A1 | | 8/2004 | Yamaguchi et al. |
| 2008/0118802 A1 | | 5/2008 | Szrama et al. |
| 2010/0159303 A1 | | 6/2010 | Rock et al. |
| 2015/0210905 A1 | | 7/2015 | Hoshino et al. |
| 2016/0260989 A1 | | 9/2016 | Ikeda et al. |
| 2017/0025688 A1 | | 1/2017 | Ikeda et al. |
| 2018/0159160 A1 | | 6/2018 | Okabe |
| 2019/0091722 A1 | * | 3/2019 | Greenley ................ C08G 59/18 |

FOREIGN PATENT DOCUMENTS

| | | | | |
|---|---|---|---|---|
| CN | | 105938911 | 9/2016 | |
| DE | | 102012014756 | 1/2014 | |
| DE | | 102015117077 | 5/2016 | |
| FR | | 1379264 | 11/1964 | |
| JP | | 2007-134234 | 5/2007 | |
| JP | | 2016-162649 | 9/2016 | |
| JP | | 2016-201183 | 12/2016 | |
| JP | | 2022-548360 | 11/2022 | |
| JP | | 2022-548361 | 11/2022 | |
| KR | | 10-1245356 | 3/2013 | |
| WO | WO 2014/015954 | | 1/2014 | |
| WO | WO-2014015954 A1 | * | 1/2014 | ......... B29C 65/4835 |

OTHER PUBLICATIONS

International Search Report and Written Opinion for International (PCT) Patent Application No. PCT/PE2019/082500, dated Feb. 12, 2020, 12 pages.
Official Action with English Translation for Japan Patent Application No. 2022-516595, dated Apr. 4, 2023, 12 pages.
Official Action with English Translation for Korea Patent Application No. 10-2022-7009794, dated Jul. 3, 2024, 11 pages.
International Search Report and Written Opinion for International (PCT) Patent Application No. PCT/PE2020/065804, dated Jul. 21, 2020, 8 pages.
Official Action with English Translation for China Patent Application No. 201980100904.2, dated Oct. 9, 2023, 16 pages.
Official Action with English Translation for China Patent Application No. 202080067797.0, dated Dec. 4, 2023, 13 pages.
Official Action with English Translation for China Patent Application No. 202080067797.0, dated May 17, 2024, 10 pages.
Official Action with English Translation for Japan Patent Application No. 2022-516596, dated Apr. 4, 2023, 14 pages.
Official Action with English Translation for Korea Patent Application No. 10-2022-7009795, dated Jul. 3, 2024, 13 pages.
Official Action for U.S. Appl. No. 17/764,674, dated May 14, 2024 9 pages Restriction Requirement.
Official Action for U.S. Appl. No. 17/764,674, dated Aug. 2, 2024 19 pages.
Official Action for U.S. Appl. No. 17/764,674, dated Feb. 19, 2025 17 pages.

* cited by examiner

METHOD FOR BONDING COMPONENTS OF A FUEL CELL

CROSS REFERENCE TO RELATED APPLICATIONS

This application is a national stage application under 35 U.S.C. 371 and claims the benefit of PCT Application No. PCT/EP2019/082500 having an international filing date of 26 Nov. 2019, which designated the United States, which PCT application claimed the benefit of German Patent Application No. 10 2019 006 820.3 filed 30 Sep. 2019, the disclosures of each of which are incorporated herein by reference in their entireties.

The invention relates to a method for bonding components of a fuel cell with a frame and/or with one another, according to the type defined in greater detail in the preamble of claim 1. The invention further relates to the use of such a method in the manner specified in claims 11 and 12.

The bonding of components of a PEM fuel cell with a frame and/or with one another by means of UV-curable adhesive is known from the prior art. For example, US 2018/0159160 A1 discloses a frame which is completely permeable to ultraviolet light, in order to be able to have the bonding cured through the frame. Here, the frame is bonded to a membrane having a catalytic coating, with gas diffusion layers also being incorporated in the composite. The structure comes with the disadvantage, that on the one hand, it requires a frame largely transparent to UV radiation, which is not the case with the typically used frames from polyethylene naphthalate (PEN). DE 10 2015 117 077 A1 also describes the bonding of components of a PEM fuel cell within a so-called membrane electrode assembly (MEA). In this case, a UV-curable adhesive is used as well, which here and in the similar document JP 2016-201183 A1 is firstly activated, in order to then connect the corresponding components to one another, and achieve a final curing of the adhesive not before the components are placed with respect to one the other, and the adhesive accordingly wetted the components to which it had originally not been applied. In this case, the components are bonded amongst one another, such as e.g. the gas diffusion layers on to the membrane, as well as also with the frame, such as e.g. the membrane with the frame and one of the gas diffusion layers to the frame.

A characteristic in a such method lies with the fact that firstly the activation of the UV curable adhesive occurs by means of a small amount of radiation. Curing of the adhesive then starts from this point in time. Activation without having the adhesive cured causes a slow hardening of the adhesive, so that this adhesive continues to harden more and more during the process, and becomes more and more viscous, so that a wetting of all the surfaces to be bonded with the adhesive is difficult as a result.

The bonding of a catalyst coated membrane (CCM) (Catalyst Coated Membrane) with frames is also of crucial importance for the sealing of fuel cells. Typically, when bonding a full-surface coated membrane, only the surface of the catalyst is bonded to the surface of the frame. Due to a poor adhesion of the catalyst to the actual membrane or its ionomer, leaks, which ensure a mixing of hydrogen and oxygen and thus a defective fuel cell, are now very common, which, with correspondingly high leakage rates, can lead to the failure of the entire fuel cell stack. In practice, it is therefore common and conventional to coat the material of the membranes with catalyst only in the region in which it is also necessary. The edges of the membranes, which are bonded to the frame, are then free of catalyst. They can therefore bond correspondingly well with the frame, so that there is a close adhesion of the membrane material to the frame, without catalyst lying there between.

However, this structure has the serious disadvantage that the membranes, which are only partially coated with the catalyst, must be positioned very precisely. In addition, the membrane material in the uncoated region is typically dimensioned relatively large in order to ensure secure bonding. The excess material is then cut off and disposed of, so that there is a disproportionate amount of material used in the production.

Furthermore the coating of sections of the membrane only is very complex and requires specialized equipment and ink catalysts compatible with direct membrane coating. This is a further disadvantage.

It would therefore be desirable to use a membrane fully coated with catalyst, so that the entire material, which is unrolled, for example, over a roll, can also be used in the structure of the fuel cell. In addition, the required positioning accuracy in a membrane fully coated with catalyst is much less critical than is the case with only partially coated membranes.

U.S. Pat. No. 9,831,504 B2 tries this out. In order to minimize the aforementioned disadvantages of poor adhesion, an adhesive is used which comprises, on the one hand, thermally curable components and, on the other hand, UV-curable components. As is stated in the document regarding the UV-curable components, once the adhesive is put in place, it remains there and no longer flows. Subsequently, the frame and the membrane are joined, wherein ultimately the curing of the previously positioned, precisely placed adhesive takes place by thermal effects in which heat is introduced, for example, with a UV irradiation of a frame made of polyethylene naphthalate (PEN), which per se is not permeable or only very slightly permeable to UV radiation in the wavelength of typically 365 nm that is necessary for the curing of adhesive, so that predominantly heat is released via the UV radiation.

However, the inventors of the present invention have not been able to determine appreciably better properties of the bonding compared to the prior art mentioned at the outset in experiments with such methods.

Reference may also be made to US 2008/0118802 A1 for further prior art.

The object of the present invention is now to provide an improved method for bonding components of a PEM fuel cell with a frame and/or amongst one another. This object is achieved by a method having the features in claim 1. Advantageous embodiments and further developments are specified in the dependent claims. Preferred uses are indicated in claims 11 and 12. Advantageous embodiments likewise result from the sub-claims dependent thereon.

The inventors have discovered in their experiments that an adhesive curable by electromagnetic radiation, such as preferably a light or UV-curable adhesive, which is applied to the components and/or to the frame is ideally suited for such bonding. The decisive knowledge of the inventors now is that the adhesive is reduced in viscosity through heat input after the activation of the adhesive, i.e. the adhesive has a lower viscosity. On the one hand, this allows to counteract the initial stages of curing, and on the other hand, to achieve a good penetration into in particular porous or especially microporous surfaces on the components, due to the very low-viscous characteristics of the adhesive achievable thereby. Here, the adhesive that penetrates the porous surfaces, which, due to its largely reduced viscosity, owing to heat, is absorbed also by the smallest pores, allows complete or at least almost complete penetration of the porous surfaces. Therefore a much higher adhesive strength in the bonding is achieved due to the adhesives contact with the base material of the component, i.e. in the case of the membrane with the ionomer.

The method according to the invention offers two different approaches to achieve this great advantage. In the first case the adhesive is activated by light or preferably UV before the components and the frame and/or the components to one another are brought into contact. Thereafter the heat is applied. In the other case the components and the frame and/or the components to one another are brought into contact. The adhesive is thereafter activated and heated by UV or preferably light in one shot.

In both cases a very good penetration of the porous or microporous surface or layer of the component is achieved, involving the respective advantages in view of quality and useful life of the respective fuel cell, or the membrane electrode assembly thereof.

An advantageous further embodiment of the invention is characterized in that the components of the PEM fuel cell having a microporous surface at least on a surface bonded to the other component and/or the frame. Especially those components with such microporous surface layers, such as the catalyst on the CCM or the microporous layer (MPL) on the gas diffusion layer (GDL) benefits from the inventive bonding method which allows a at least almost direct bonding of the base materials under the microporous surface layer without the need of removing the same or omitting its application in the bonding regions.

In a preferred further development of the inventive method the heat is produced in the components through the application of electromagnetic radiation, preferably in the range of visible light or UV. Such a heating with electromagnetic radiation, especially visible light or UV allows a very direct application of the heat to exactly the region where the heat is needed, such as the microporous surface layer. The heat typically arises at the layer which has the least transparency, which is generally the microporous catalyst coating of the membrane or the MPL of the gas diffusion layer. Typically, these can be equated approximately with the properties of a black body that absorbs all of the light and converts it to heat. The heat input is thus produced through the irradiation from the side of the frame or the rear side of the component, mainly in the region in which the adhesive is to be liquefied to a very low viscosity, so that it can take place via capillary forces through the pores of the very strong heating catalyst, which is due to its low thermal mass also being heated very quickly.

The heating is achieved by two different methods or a combination thereof. The first one is the production of the heat in the microporous surface layer itself. The microporous surface layer, i.e. the catalyst layer of the CCM or the MPL of the GDL, is typically of a very dark color. It is acting as a kind of black body wherein the heat from the exposure to light or UV is produced. As this is the surface or layer to be penetrated with the adhesive while its viscosity is lowered this is ideal. Furthermore the heating of the adhesive is confined to the irradiated region. Therefore the danger of adhesive flowing into regions where it is not wanted is reduced. The second one is the production of heat in and or through the frame. Typically the frame is transparent. But even though it is transparent, e.g. made of PEN, it will transmit little or even no UV radiation in the wavelength of, for example 365 nm. However, there will be a corresponding heat input due to the radiation being transferred into heat partly in the PEN frame and partly by causing a shift in the wavelength. The radiation shifted in the wavelength can then pass the PEN frame and causes the black body effect in the microporous surface layer. This means that the first and the second method applies here in the kind of a mixture between those. For the use of radiation in the range of visible light, e.g. at 430 nm, the PEN frame is transparent. Therefore the first method applies alone.

The previously activated adhesive can penetrate the pores of the microporous surface layer before it finally cures. The structure also has the advantage that the heat is introduced in a very targeted manner and almost exclusively in the region of the catalyst or of the gas diffusion layer and the adhesive. A penetration of neighboring components with the adhesive, in particular of the electrochemically active regions in the later structure of the PEM fuel cell of the catalyst coated membrane and/or of the gas diffusion layer respectively arranged adjacent thereto, can be prevented as a result.

The use of electromagnetic radiation, preferably in the range of visible light or UV, to heat up the adhesive has a further advantage. The use of light or UV allows a high ramp rate of the heat. The heating in the region where it is needed can be achieved in typically less than 5 seconds. This allows the penetration of the microporous surface layer and a very fast and effective bonding process. The method according to this embodiment is therefore ideal for an effective industrial production.

According to an advantageous further development of the invention, the adhesive is free of thermally crosslinking constituents and thus differs significantly from the approach in the above-mentioned prior art. Unlike in this prior art, it is not the intention of the inventors to hold the adhesive in place. Rather, the activated (once via UV radiation, for example, a short pulse of UV radiation) but still liquid adhesive between the catalyst coated membrane or other components and the frame is applied and heated. Unlike in the prior art, no immediate crosslinking is initiated through the heating of the adhesive. Rather, the adhesive becomes much thinner through the heating, so that its viscosity is thus reduced. The adhesive is already essentially at the place where it should be at this time. The adhesive will flow and pass through the microporous catalyst surface or layer on the membrane or the MPL of a gas diffusion layer through capillary forces, whereby further flow in plane is limited by fast curing. The catalyst layer is porous only to very low viscosity liquids, so that a very thin adhesive having very low viscosity can pass the pores by means of the capillary forces. As a result, trials with investigations of the cross-sectional area under the electron microscope and corresponding trials to pull the bonded layers apart have achieved a much higher bond strength.

The inventors assume that the adhesive, which has become very thin due to the heating, penetrates the entire layer of the catalyst in its thickness in the region in which the adhesive is applied, so that, in spite of the existing catalytic coating, ultimately, there is bonding between the material of the frame on the one hand and the ionomer, that is, the actual membrane material of the catalyst coated membrane on the other hand. Corresponding sectional images, which have been investigated by electron microscopy, prove this. The same applies to a gas diffusion layer. This layer is also, due to its porosity, deeply penetrated into the material by the adhesive that has become very low-viscous, so that this bonding achieves an ideal adhesion, e.g. also to the frame or on the catalyst-coated membrane, the coating material of which has likewise been penetrated.

An advantageous embodiment of the method according to the invention further provides that the adhesive is a cationic epoxy. Cationic epoxy allows the activation by UV light as well as with blue visible light as the inventors find out. It is therefore ideal for the two cases of the two methods (pre-activation and one shot) according to the invention. In a further very advantageous development thereof the cationic epoxy has a content of water, i.e. between some 100 ppm and up to 1.5% weight, but not limited thereon. This small amount of water which can be achieved by the atmospheric conditions when working with the adhesive causes the adhesive to cure delayed. This delay in curing after the activation with light or UV in comparison to the much faster start of the curing of a water-free cationic epoxy is ideal for the use in the methods according to the invention. Furthermore the small content of water allows a faster curing after it has started delayed also in comparison to a water-free cationic epoxy. This is also advantageous for the inventive methods as the fast curing after the delayed start thereof reduces the flow of the adhesive into unwanted areas.

An advantageous development of the method according to the invention further provides that the components and/or the frame are held one on to the other or pressed against one another by means of a hold-down device, with the application by electromagnetic radiation occurring through at least one window in the hold-down device, transparent to the radiation. Such a hold-down device or also a pressing tool with suitably, not too high pressing forces can thus be used in order to position the components and/or the frame with respect to each other. Windows transparent to the radiation can now be provided on the respective points, so that the radiation can advance through the windows, e.g. as far as to the components, in particular to the gas diffusion layers, and thus the required heat can be input, before the adhesive activated by the radiation finally hardens.

As had already been stated, the heat input can occur via the radiation, which ultimately ensures heating of the component itself or of the catalyst coating of the component, in a very punctual and targeted manner. Nevertheless, it can be provided in a very advantageous embodiment of the method that at least one region of the hold-down device adjacent to the transparent window of the hold-down device is cooled, in particular actively cooled. In this way, the heat input can be restricted to the section corresponding to the transparent window in a very targeted manner, so that the membrane and/or the gas diffusion layers as well as the frame as the components to be bonded are not unnecessarily thermally stressed beyond the gluing spot. The cooling, respectively active cooling, which might be implemented passively, for example via cooling fins, or actively by means of a cooling fluid, is e.g. moved alongside cooling fins or through cooling conduits within these regions, further contributes to heat being dissipated in the edge regions and does not return into the region of the bonding. This way, ultimately the cycle time for forming the bonds can be reduced, achieving economic advantages.

In the case of bonding a frame to a component, such as a catalyst coated membrane, according to an improved embodiment of the invention the application of electromagnetic radiation at least for heating is carried out from the side of the frame through the same. This allows very easy handling and enables the method in an ideal way to be used in an industrial production line without the need of a complex turnover of the not jet bonded materials or a second source of radiation.

In the scenario of the invention described as the one shot method a further development provides in the case of bringing the frame and/or the components into contact and heating the adhesive by electromagnetic radiation, the activation and the heating is done by the electromagnetic radiation in the same single exposure of the adhesive to the electromagnetic radiation. This can be done preferably with visible blue light in the range of 430 nm but is not restricted thereon.

As already indicated, a very advantageous use of the method according to the invention provides for bonding a membrane that is full-surface coated, with a frame. The completely catalyst coated membrane as one of the components can be bonded to the frame securely and reliably by using the method according to the invention, as would otherwise only be possible with a membrane that is exempt of the catalyst coating in the region of the bonding, which, however, would result in the above-described disadvantages.

An alternative, but equally suitable use of the method according to the invention is to implement said method in order to bond at least one gas diffusion layer as a component with a catalyst coated membrane as the further component and/or the frame. A gas-diffusion layer, with an MEA typically comprising two of such gas diffusion layers, one on the anode side and one on the cathode side, is microporous at least on the side that faces the membrane, in order to distribute the arriving gases as uniformly as possible to the available area of the membrane. The described method is therefore particularly suitable for bonding such a gas diffusion layer, which is in particular directly bonded to the respective side of the membrane and, as required, to the frame.

A particularly favorable combination of this use provides that at least one, but preferably two gas-diffusion layers are bonded to a previously bonded and cured composite of the catalyst full-surface coated membrane, and the frame. This particularly favorable use of the method according to the invention provides that in a first method step, a catalyst coated membrane (CCM) is accordingly bonded to a frame enclosing said membrane. To that end, the adhesive can preferably be applied to the edge region of the catalyst coated membrane and be correspondingly activated. Then, the frame is placed-on, and the irradiation is continued through the frame. Depending on the wavelength used, the radiation either heats up the PEN film and consequently heats the adhesive and/or directly heats the catalyst layer and consequently the adhesive with the above described effect of the adhesive becoming very low-viscous and completely penetrating the catalytic coating, so that a removal of the catalytic coating of the membrane can be eliminated around the edge regions. This composite of the catalyst full-surface coated membrane and the frame is subsequently correspondingly cured and held available as so-called semi-finished products. This composite is bonded using one, preferably two gas diffusion layers. One diffusion layer, for example that of the anode side, is positioned on the catalyst coated membrane within the frame, and is provided with an adhesive in the edge region, which adhesive comes to rest between the gas diffusion layer and the membrane, while the other gas diffusion layer overlaps the entire membrane and preferably protrudes minimally beyond said membrane. In the edge region, it is likewise coated with the adhesive. In this case, the adhesive is again activated by means of radiation. The components are then joined accordingly and held in position one with respect to the other, using a hold-down device or a pressing device, and is irradiated with radiation preferably through transparent windows of said hold-down device, in order to accordingly heat-up the adhesive and to achieve an ideal bonding of the composite with the two gas diffusion layers, so that as a whole, an intrinsically dense and stably-bonded structure results for the membrane electrode assembly.

Further advantageous embodiments arise from the exemplary embodiment, which is described in more detail below with reference to the figures.

Figure 2:
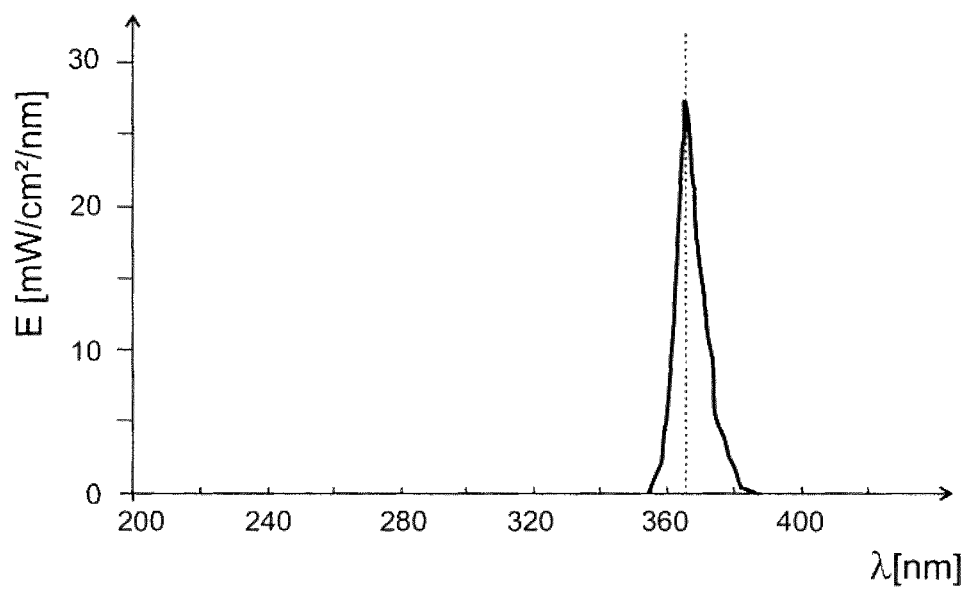
Figure 3:
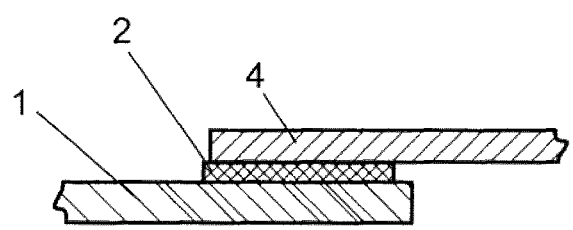
Figure 4:
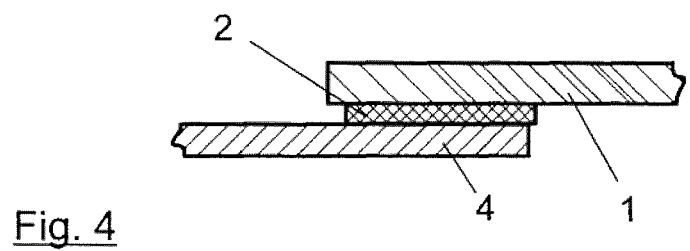
Figure 5:
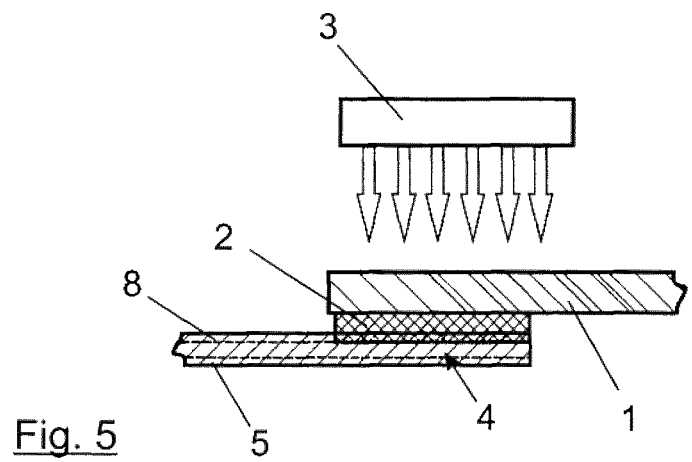
Figure 6:
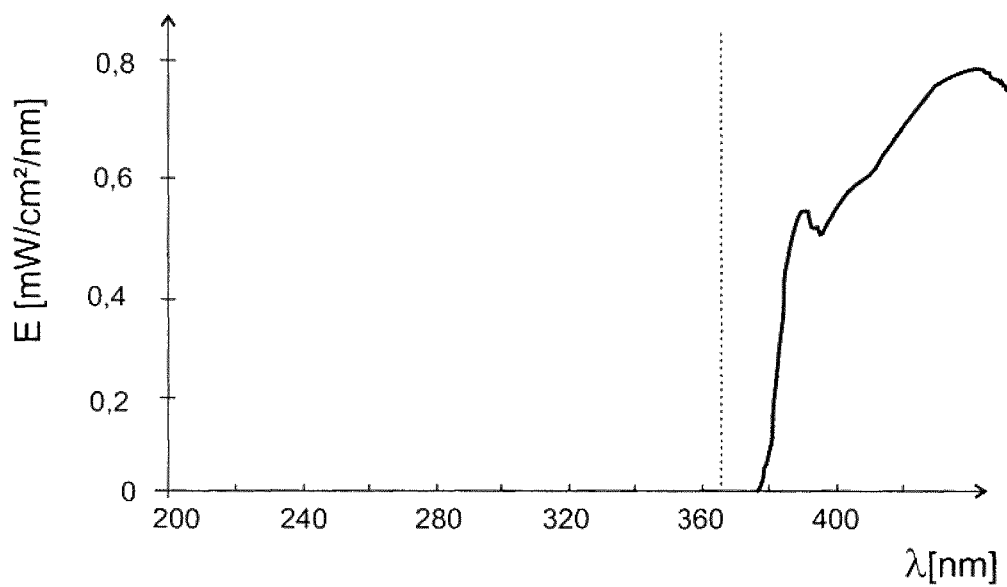
Figure 7:
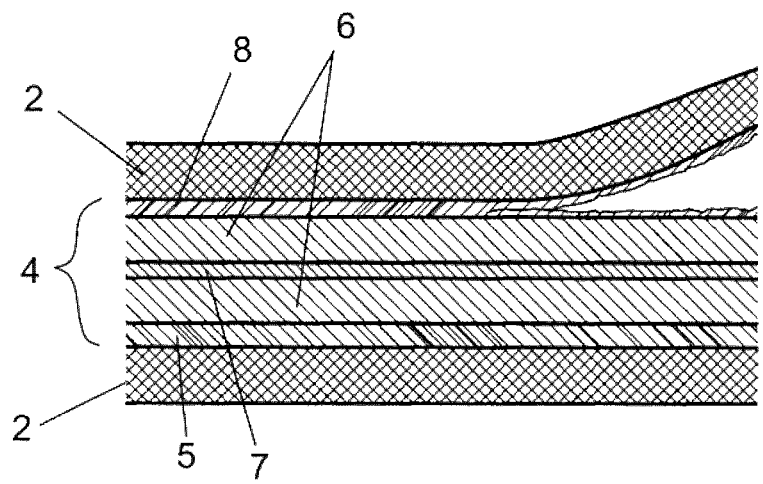
Figure 8:
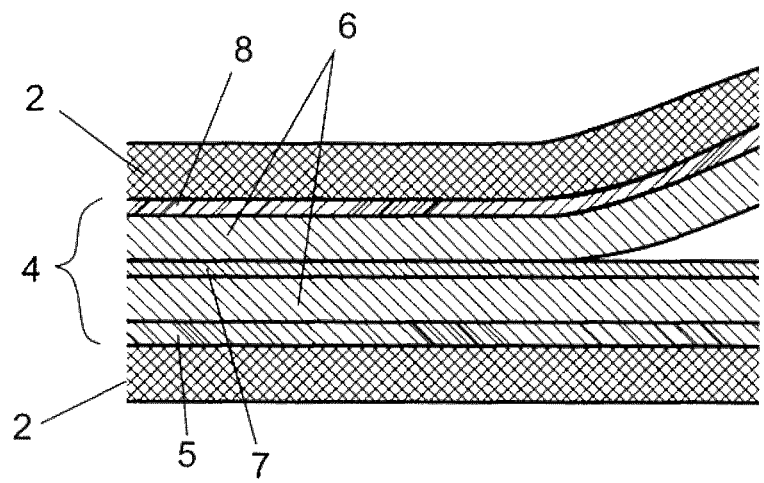
Figure 9:
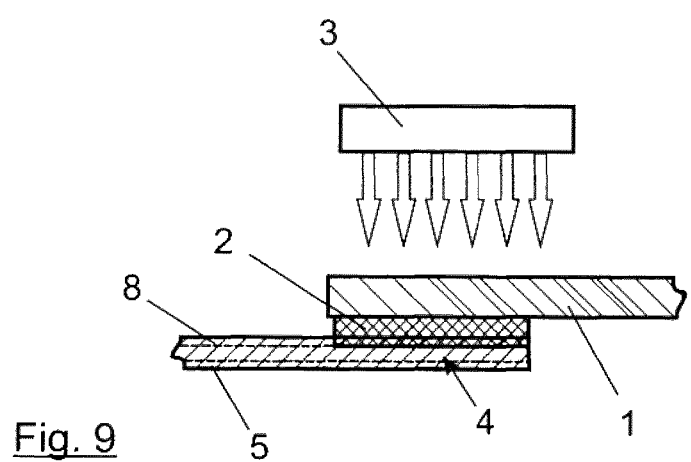
Figure 10:
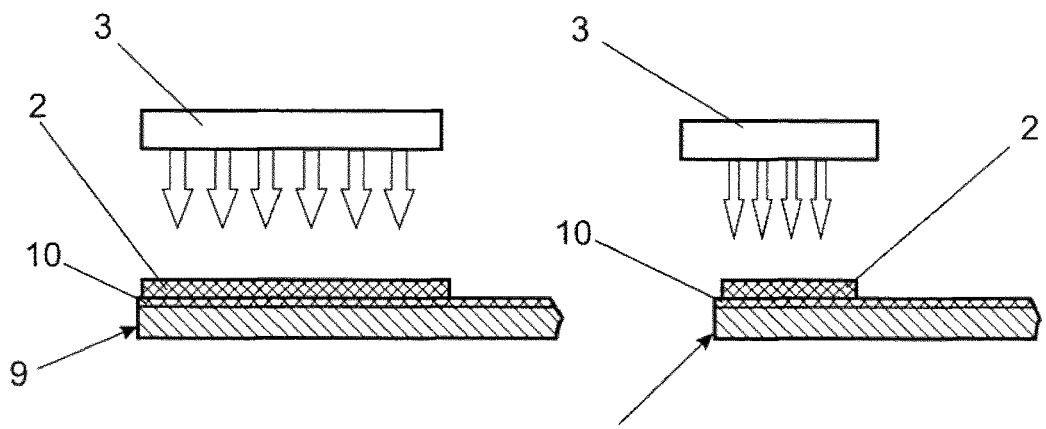
Figure 11:
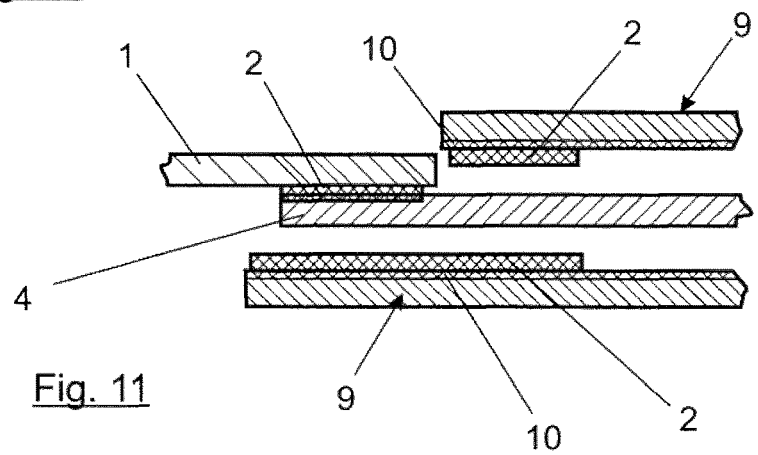
Figure 12:
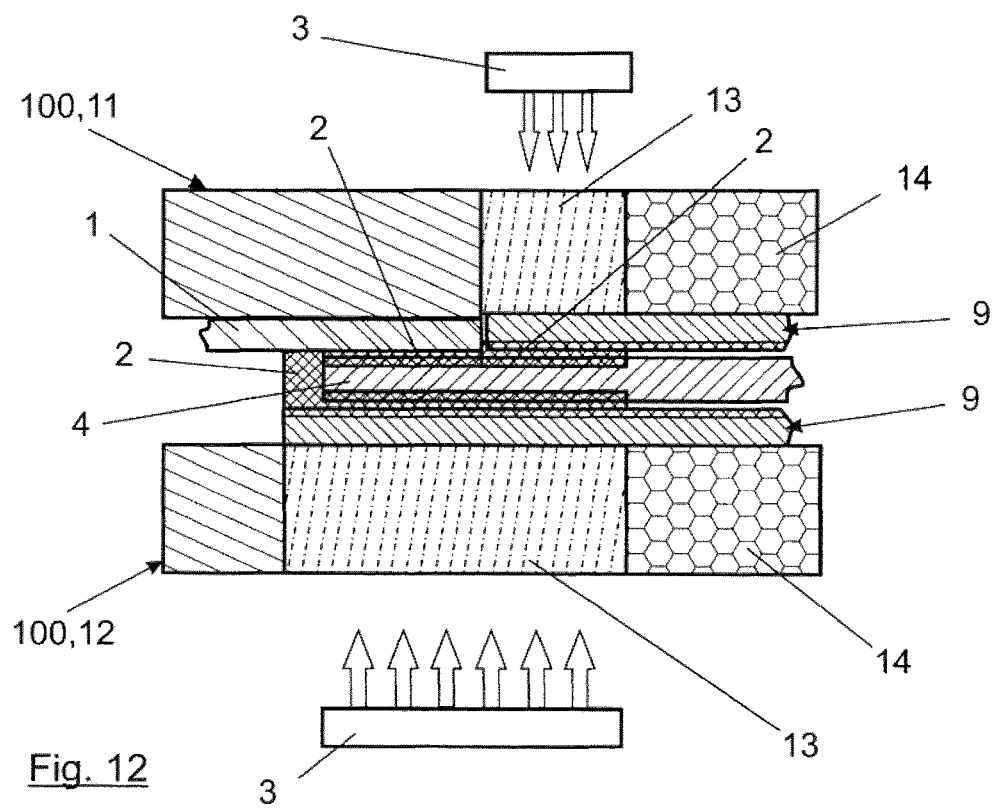
Figure 13:
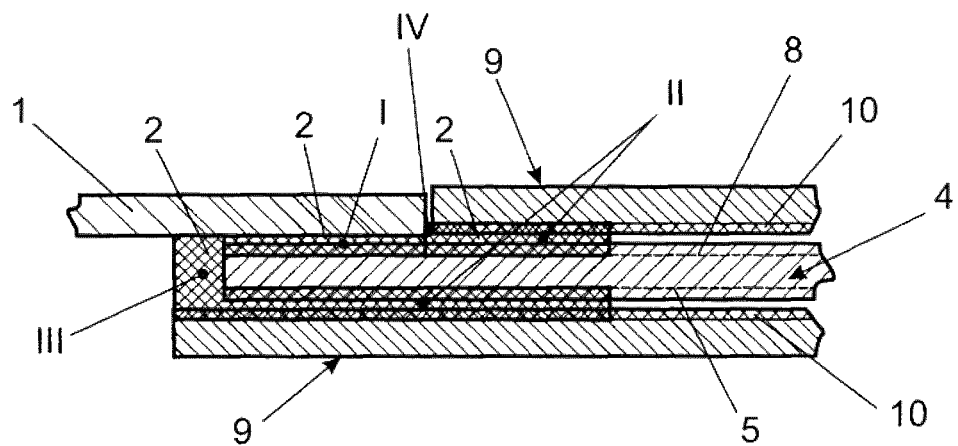
Figure 14:
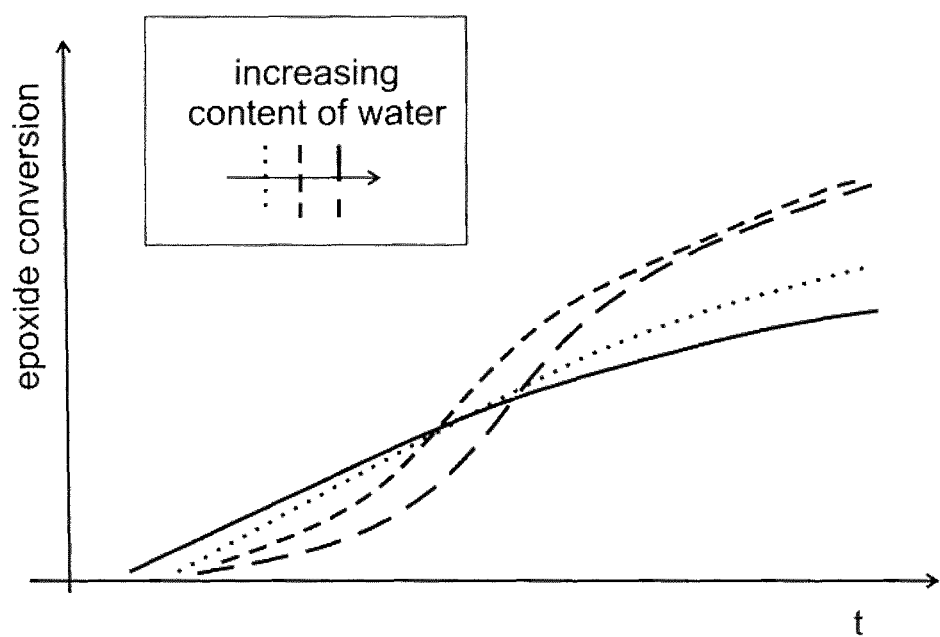

Shown are:

FIG. 1 a first step of a first method according to the invention;

FIG. 2 a plot of the energy of UV radiation of a UV source over the wavelength;

FIG. 3 a second step of the a first method according to the invention;

FIG. 4 a third step of the first method according to the invention;

FIG. 5 a fourth step of the first method according to the invention;

FIG. 6 a diagram of the energy of the frame-penetrating radiation of the radiation source according to FIG. 2;

FIG. 7 a schematic representation of an electron micrograph of a cross-section through a structure having a bonding according to the prior art;

FIG. 8 a schematic representation of an electron micrograph of a cross-section through a structure having a bonding according to the invention;

FIG. 9 a step from a second method according to the invention;

FIG. 10 a schematic representation of an application with UV radiation and activation of the adhesive on two gas diffusion layers;

FIG. 11 a schematic illustration of the components provided with the activated adhesive, prior to bonding;

FIG. 12 an illustration similar to that of FIG. 11, with an additional hold-down device for positioning the components during bonding;

FIG. 13 a schematic illustration of the bonded structure of gas diffusion layers, catalyst coated membrane and frame; and FIG. 14 a schematic diagram illustrating the effect of the water content of a cationic epoxy on curing.

The invention uses a full-surface membrane coated with catalyst for producing a composite of frame and catalyst coated membrane (CCM) for a PEM fuel cell, in which there are no sections provided for bonding, in which the membrane has not been coated with the catalyst or the catalyst catalytic coating has been removed. The catalyst coated membrane is bonded to the frame in order to produce the composite. In addition, this composite is subsequently bonded to two gas diffusion layers, in order to then form the core of the membrane electrode assembly (MEA). However, the method can also be used for other bonding tasks, or only part of the described bonds.

A part of this frame is shown and designated 1 in the illustration of FIG. 1. An adhesive 2 activatable by UV radiation is attached on the frame 1, for example applied via screen printing or inkjet printing in a designated region. The applied adhesive 2 is then briefly irradiated with UV radiation via a UV source 3 in order to activate it. The adhesive 2 remains liquid in this case, the length and/or introduced energy activation via the UV source 3 must therefore be adjusted accordingly. In the illustration of FIG. 2, the spectral irradiance E is plotted in a diagram on the y-axis, for example, in $mW/cm^2/nm$, while the wavelength is plotted in nm on the x-axis. Under normal conditions, the UV source 3 emits the UV radiation directly onto the adhesive 2 in the structure shown in FIG. 1. Its peak is at 365 nm. As already mentioned, the UV-curable adhesive 2, which is free of thermal curing constituents, is thus only activated, but remains liquid in the region in which it was applied. Instead of the UV radiation, e.g. at the mentioned wavelength and with the parameters mentioned above, an irradiation is also possible at, e.g., a wave length of approximately 430 nm, which means in the range of visible light. Everything said and described thereafter can be used with radiation at such a wavelength analogously.

In the illustration of FIG. 3, it can be seen how now the catalyst coated membrane 4 is placed in exact position on the frame 1 and the adhesive 2. In the illustration of FIG. 4, it can be seen then that the previous structure of the frame 1, the adhesive 2 and the catalyst coated membrane 4 is reversed. The frame 1 is made of transparent material, preferably polyethylene naphthalate (PEN). PEN has the property of the UV radiation not passing through the material or only to a very small extent, so that in the case of the renewed irradiation of the structure with the UV source 3 shown in FIG. 5, only a very small amount of UV is introduced into the adhesive 2, which is not the main contributor to curing the adhesive as it is already activated by the procedure illustrated in FIG. 1. But the UV radiation is converted into heat in the PEN frame 1 which results in a heating of the adhesive 2 in direct contact thereto.

The course that has been described could, of course, also be achieved differently from that described and illustrated here. For example, the adhesive 2 could also be applied directly on to the full-surface catalyst coated membrane 4. Activating the adhesive 2 by means of UV radiation through the UV source 3 can accordingly take place from above. Subsequently, the frame 1 can be positioned over the applied and activated adhesive 3, and without having to flip-over or to move the structure. Now, via the same UV source 3, the UV radiation can be made use of to heat the catalytic coating of the membrane 4 through the frame 1. This structure is again simpler in terms of handling.

The illustration of FIG. 6 shows, in a diagram analogous to that in FIG. 2, which amounts of energy and which wavelengths penetrate the frame 1 made of PEN. It is noticeable that virtually no UV radiation occurs below 375 nm. The peak of the UV radiation is now at about 385 nm which is, much lower than in the case of the irradiation according to FIG. 2. In the region above 400 nm, part of the light also occurs as visible light in the violet and blue regions. This means that for a wavelength of 365 nm, the PEN causes a wavelength shift, whereby a small proportion of UV radiation and visible light penetrates through the frame 1 made of PEN, while most of the UV energy is converted to heat which heats up the transparent adhesive 2. For a wavelength of 430 nm, most of the UV radiation passes through frame 1 and likewise through largely transparent adhesive 2 to the catalytic coating of the membrane 4. There it meets the catalytic coating, which is relatively dark and ultimately acts in the nature of a black body. It therefore absorbs the light energy and converts it largely into heat. Due to the relatively low thermal mass, there is a comparatively strong heating of the adhesive. The adhesive thins, thus obtaining a very low viscosity, since its viscosity decreases with increasing heat. The very thin adhesive 2, which is not yet cured at this time, since the curing via the UV irradiation in FIG. 1 has been activated but not yet completed, can thus very easily penetrate through the heat-induced thinning into the pores of the catalytic layer on the membrane 4. It thus essentially penetrates the porous catalytic layer and joins directly with the ionomer of the catalyst coated membrane 4, so that a very deep and stable connection occurs, although the catalytic coating 5, 8 has not been removed in the region of the bonding.

Experiments by the inventors in cross-sections which have been studied by electron microscopy confirm this. In the illustration of FIG. 7, such an image is indicated purely by way of example. A section having a thickness of about 30 μm shows, from bottom to top in the right region of the adhesive 2, the catalytic coating on the cathode side, which is designated here by 5. Then follows the ionomer (denoted by 6) of the membrane 4 and a reinforcing ply, denoted by 7, enclosed with a second layer of ionomer 6. On the other ionomer layer 6, the catalytic coating with the anode catalyst is shown (and denoted by 8) with the catalytic coating 5, therefore, being the cathode catalyst. The catalytic coatings 5, 8 forms microporous surfaces or layers on the ionomer 6. Again, this is followed by a layer of the adhesive 2. A tear test with a bonding according to the prior art has now yielded the image shown in FIG. 7, namely that the bonding takes place in such a way that the adhesive 2 is superficially bonded to the surface catalytic coating with limited adhesive penetration, here the catalytic coating 8 of the anode side, and thus cohesively break within the catalyst layer when torn. This corresponds to the problem according to the prior art.

In the illustration of FIG. 8, the same image is shown again with the type of bonding described here. In FIG. 8, on the left, the construction is again shown, in which it has been recognized by inspection via the electron microscopic evaluation that the catalyst has changed somewhat in this region and obviously is completely penetrated by the adhesive 2. This illustration has been omitted here due to the limited display options in the line drawing. However, what is decisive is the result of a tear test shown in the right region of FIG. 8. It will be recognized that, unlike the prior art, the ionomer 6 ruptures along the reinforcing ply 7 and remains firmly bonded to the catalytic coating 8 of the anode side and the adhesive 2. The strength of the bonding surface is therefore obviously higher than the strength of the actual membrane 4, so that a structure to be realized particularly solid and tight could be achieved by the method according to the invention.

An alternative method can also be used, preferably with visible light. As illustrated in FIG. 9 which in fact shows almost the same as FIG. 5 the adhesive 2 can be applied to the frame 1 and/or the membrane 4. The previous described step of activating the adhesive 2 with a first exposure to the electromagnetic radiation is obvious. Instead the activation and the heating is carried out with the same exposure to the electromagnetic radiation, preferably blue visible light with a wavelength of about 430 nm. The inventors have found out that light at about this wavelength enables the activation and thereby the time delayed curing of the adhesive. i.e. a cationic epoxy with a small content of water, as well as the heating before the adhesive is finally cured. Such a single exposure or shot with the light allows a very fast processing of the bonding method.

This composite described in the previous Figures of frame 1 and the membrane 4 can now be held available as some kind of semi-finished product. A next step can provide that two gas diffusion layers (GDL) 9 are coated with the adhesive 2 in their edge regions, e.g. in turn by means of a deposition method such as screen printing or inkjet printing, as before with the frame 1 or the membrane 4. This is explained in greater detail in the illustration of FIG. 10 using the example of two gas diffusion layers 9. As an example design and process but not limited to, one of the gas diffusion layers 9 is coated in the edge region in a relatively large portion, the other one in a corresponding smaller portion. In this case, the two gas diffusion layers are to be, on the left, the gas diffusion layer 9 for the cathode of the fuel cell and on the right, the one for the anode of the fuel cell. Each of the gas diffusion layers 9 is provided with a microporous layer MPL 10 on the side which is later made to face towards the membrane 4. The adhesive 2 is applied to said MPL 10 of the respective gas diffusion layer 9 and, as is indicated in the illustration of FIG. 9 by the arrows and the UV or light source 3, briefly irradiated with electromagnetic radiation to activate the adhesive 2.

The illustration of FIG. 11 shows the prepared structure for bonding the two gas diffusion layers 9 to the composite of frame 1 and membrane 4, which composite is already cured. The frame 1 with the membrane 4 is introduced in between the two gas diffusion layers 2 with the respective adhesive 2. The gas diffusion layer 9 for the anode of the fuel cell, which is illustrated in the upper part here, rests within the frame 1 on the membrane 4, and is coated with said adhesive in the edge region. The gas diffusion layer 9 of the cathode 9 illustrated below the composite of frame 1 and membrane 4 has a correspondingly wider coating of adhesive, so that it is also bonded to the membrane 4 in the same portion in which the other one of the gas diffusion layers is bonded to the membrane 4, and, at the same time, ensures that the region of the membrane 4 that is already bonded to the frame 1 is bonded to said gas diffusion layer 4 as well. In addition, the width of the applied adhesive 2 is so large that a bonding between the illustrated gas diffusion layer 9 of the cathode and the frame 1 is also achieved in the edge region. The components, which are shown so as to form-fit to one another but nevertheless spaced from one another, are now positioned one with respect to the other using a hold-down device 100 or a pressing tool, and are held against each other under slight pressure. This is accordingly indicated in the illustration of FIG. 12. The hold-down device here comprises a lower part 11 and an upper part 12, which are pressed against each other under slight pressure, in order to position the frame 1 as well as the membrane 4 and the two gas-diffusion layers 9 as the components to be bonded, one against the other in a reliable manner. The already activated, UV-curable adhesive is correspondingly heated by means of UV radiation source 3 as an example but not limited to, through two indicated transparent windows 13 in the two parts 11, 12 of the hold-down device 100. In this case, the transparent window 13 is preferably transparent, e.g. made of glass, quartz or similar. That is, the UV radiation penetrated said transparent window 13 and therefore heats up the respective gas diffusion layer 9 by means of black body effect in the region that has the transparent window 13 formed therein, i.e. in particular in the region where the adhesive 2 was applied as well. Finally, the adhesive 2 is heated, in order for it to become low-viscous, and on the other hand, in order to penetrate through the microporous layer 10 of the respective gas diffusion layer 9 and, on the other hand, the catalytic coating 5, 8 of the membrane 4 in the already-described ways and manners.

At the same time, adhesion of the adhesive 2 occurs on the side of the frame 1 on the anode side of the structure, as well as adhesion of the GDL or of the MPL 10 thereof occurs on the frame 1, penetrated by the adhesive 2 laterally next to the membrane 4, so that an overall very dense structure is formed, which is again shown in the illustration of FIG. 13. Here, the region indicated with I indicates the connection between the catalyst coated membrane 4 and the frame 1, with the catalytic coating 8 of the anode side of the membrane 4 being penetrated by the adhesive 2. The two regions indicated by II show the bonding between the gas diffusion layer 9 or the MPL 10 thereof and the membrane 4. Here, the adhesive 2 penetrated into the respective MPL 10 and the respective catalytic coating 5, 8. The region indicated by III shows the bonding between the lower one of the gas diffusion layers assigned to the cathode of the fuel cell or of the MPL 10 thereof, and the frame 1. The face side of the frame 1 in the region of the other gas diffusion layer 9 is also wetted by an adhesive in the region indicated by IV, so that a sealing of the structure occurs here as well. The active region of membrane 4 and gas diffusion layers 9 usable for the active reaction of the substances in the fuel cell then starts in the illustration of FIG. 13, on the right and next to the adhesive 2.

In order to, on the one hand, protect this electrochemically-active region, and to maintain the heat input for liquefying the adhesive 2 within the desired range in a targeted manner, it can be provided that a cooled region is provided in the upper part 12 and/or the lower part 11 of the hold-down device 100. In the illustration of FIG. 12, two cooled regions are respectively provided on the right next to the transparent windows 13, both regions indicated by 14. Furthermore other regions in the more or less direct neighborhood of the windows 13 could be cooled as well. These cooled regions 14 ensure that the heat only builds up in the region of the adhesive 2 in a targeted manner, or is induced into said region respectively, and that the later electrochemically active region cannot be impaired due to this heat input. In addition, the cooling in the regions 14 allows for a very targeted heat input and for a very targeted time at which the heat input can be stopped, without allowing for the heat accumulated in the regions of the gas diffusion layers 9 located next to the transparent windows 13 to get back into the region of the adhesive 2. A third advantageous effect results in that the temperature decreases in the portions of the gas diffusion layers and of the catalyst coated membrane 4 neighboring the cooled regions 14. In other words, the adhesive 2 increases in viscosity in these regions, so that the preferably active cooling of the regions 14 also impacts the spatial extent of the adhesive 2 in an advantageous manner or can be limited, respectively.

All in all, this construction allows an ideal bonding of the crucial elements of the membrane electrode arrangement, i.e. in particular the frame 1 and the membrane 4 and the gas diffusion layers 9, which are jointly referred to as the components.

As already mentioned above the adhesive 2 could be cationic epoxy. Preferably this cationic epoxy contains a small amount of water. The diagram in FIG. 14 shows the effect of water in the cationic epoxy. The horizontal axis is the time. The vertical axis shows the epoxide conversion. The solid line is a reference to a cationic epoxy completely free of water. The dashed and dotted lines showing the curing of the epoxy when having a content of water, i.e. between some 100 ppm and up to 1.5 wt.-%. The content of water increases with the changing pattern of the lines as indicated in the explanation box of the diagram. Such a small amount of water has the effect, that the curing after the initial activation is delayed in comparison to the cationic epoxy which has no water content. After such a timely delay the curing of the cationic epoxy with water will then be even faster than of the cationic epoxy which has no water content. Therefor a very small amount of water is enough. This might be introduced into the epoxy by using it in a surrounding with high air humidity.

This delay in the curing time t is ideal for the methods of the invention as the timely delay can be used for heating and helps to get a good penetration of the microporous surface with the thinned adhesive 2. Furthermore the faster curing thereafter ensures that the curing is finalized before the thinned adhesive 2 can flow into areas where no adhesive is wanted.

What is claimed is:

1. A method for bonding components of a PEM fuel cell with a frame and/or amongst one another, wherefore an adhesive curable by electromagnetic radiation in the range of visible light or UV is applied to the frame and/or at least one component of the PEM fuel cell components characterized in that the adhesive is activated by the electromagnetic radiation and heated after the frame and/or PEM fuel cell the components are brought into contact; or
   the frame and/or the PEM fuel cell components are brought into contact and the adhesive is exposed to the electromagnetic radiation for activating and heating;
   wherein the heat reduces the viscosity of the adhesive before it is finally cured, and the heat is produced in the at least one component through application of the electromagnetic radiation, in the range of visible light or UV.

2. The method according to claim 1, wherein the components of the PEM fuel cell have a microporous surface layer at least on a surface bonded to the other component and/or the frame.

3. The method according to claim 1, wherein the adhesive is free of thermally crosslinking constituents.

4. The method according to claim 1, wherein the adhesive is a cationic epoxy.

5. The method according to claim 4, wherein the cationic epoxy contains water.

6. The method according to claim 1, wherein the components and/or the frame are held one on to the other by means of a hold-down device, wherein the irradiation with electromagnetic radiation occurs through at least one window in the hold-down device, transparent to the radiation.

7. The method according to claim 6, wherein at least one region adjacent to the transparent window in the hold-down device is cooled, in particular actively cooled.

8. The method according to claim 1, wherein in the case of bonding a frame to a component, the application of electromagnetic radiation at least for heating is carried out from the side of the frame through the same.

9. The method according to claim 1, wherein in the case of bringing the frame and/or the components into contact and heating the adhesive by electromagnetic radiation, the activation and the heating is done by the electromagnetic radiation in the same single exposure of the adhesive to the electromagnetic radiation.

10. Use of the method according to claim 1, for bonding a full-surface catalyst coated membrane as one of the components, to the frame.

11. Use of the method according to claim 1, for bonding at least one gas-diffusion layer as the component with a catalyst coated membrane as a further component and/or with the frame.

12. The use according to claim 10, wherein at least one, preferably two gas-diffusion layers are bonded to a previously bonded and cured composite of the full-surface catalyst coated membrane and the frame.

13. The method according to claim 2, wherein the heat is produced in the components through application of electromagnetic radiation.

14. The method according to claim 13, wherein the adhesive is free of thermally crosslinking constituents.

15. The method according to claim 14, wherein the adhesive is a cationic epoxy.

16. The method according to claim 15, wherein the cationic epoxy contains water.

17. The method according to claim 16, wherein the components and/or the frame are held one on to the other by means of a hold-down device, wherein the irradiation with electromagnetic radiation occurs through at least one window in the hold-down device, transparent to the radiation.

18. The method according to claim 17, wherein at least one region adjacent to the transparent window in the hold-down device is cooled, in particular actively cooled.

19. The method according to claim 18, wherein in the case of bonding a frame to a component, the application of electromagnetic radiation at least for heating is carried out from the side of the frame through the same.

20. The method of claim 1, wherein the at least one component is less transparent than another of the components of the PEM fuel cell and wherein the heat is produced in the less transparent at least one component by targeted application of the electromagnetic radiation.

\* \* \* \* \*